(12) United States Patent
Bhattacharya et al.

(10) Patent No.: US 7,882,262 B2
(45) Date of Patent: Feb. 1, 2011

(54) METHOD AND SYSTEM FOR INLINE TOP N QUERY COMPUTATION

(75) Inventors: Partha Bhattacharya, Cupertino, CA (US); Yuewei Wang, San Jose, CA (US); Eli Nathaniel Stevens, Santa Clara, CA (US); Gheorghe Mircea Sasu, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 961 days.

(21) Appl. No.: 11/207,329

(22) Filed: Aug. 18, 2005

(65) Prior Publication Data

US 2007/0043703 A1    Feb. 22, 2007

(51) Int. Cl.
G06F 15/173   (2006.01)
G06F 17/30    (2006.01)
G06F 11/00    (2006.01)

(52) U.S. Cl. .................. 709/238; 707/703; 707/770; 726/22

(58) Field of Classification Search ............ 709/238; 707/3, 703, 770; 726/22
See application file for complete search history.

(56) References Cited

U.S. PATENT DOCUMENTS

| | | | |
|---|---|---|---|
| 5,566,339 | A | 10/1996 | Perholtz et al. |
| 6,233,575 | B1 * | 5/2001 | Agrawal et al. ............ 707/6 |
| 6,502,133 | B1 * | 12/2002 | Baulier et al. ............ 709/224 |
| 6,505,192 | B1 * | 1/2003 | Godwin et al. .............. 707/3 |
| 6,550,012 | B1 | 4/2003 | Villa et al. |
| 6,609,205 | B1 | 8/2003 | Bernhard et al. |
| 6,647,400 | B1 | 11/2003 | Moran |
| 6,717,949 | B1 | 4/2004 | Boden et al. |
| 6,728,885 | B1 | 4/2004 | Taylor et al. |
| 6,795,918 | B1 | 9/2004 | Trolan |
| 6,816,455 | B2 | 11/2004 | Goldberg et al. |
| 6,826,564 | B2 * | 11/2004 | Thompson et al. .......... 707/770 |
| 6,826,697 | B1 | 11/2004 | Moran |

(Continued)

FOREIGN PATENT DOCUMENTS

JP    2002/261788 A    9/2002

OTHER PUBLICATIONS

Yener et al., "A Formal Method for Attach Modeling and Detection", Computer Science Department, Rensselaer Polytechnic Institute, Jun. 2001, 17 pages.

(Continued)

*Primary Examiner*—William C Vaughn, Jr.
*Assistant Examiner*—Muktesh G Gupta
(74) *Attorney, Agent, or Firm*—Hickman Palermo Truong & Becker LLP (57) ABSTRACT

A system and method of generating an overall top N query result from multiple sets of sessionized network events that correspond to different time periods include identifying a subset within each set of network events whose event attributes satisfy a predefined query, generating an aggregation result table for each identified subset of network events in accordance with an aggregation attribute, identifying matching first and second entries in first and second aggregation result tables that have a same aggregation attribute value, generating a new entry in a query result table by merging the matching first and second entries together, and selecting entries in the query result table that have highest session counts as the overall top N query result.

35 Claims, 10 Drawing Sheets

U.S. PATENT DOCUMENTS

| | | | |
|---|---|---|---|
| 6,829,239 B1 | 12/2004 | Bhatia et al. | |
| 6,883,162 B2 | 4/2005 | Jackson et al. | |
| 6,886,102 B1 | 4/2005 | Lyle | |
| 6,920,453 B2 * | 7/2005 | Mannila et al. | 1/1 |
| 6,950,845 B2 * | 9/2005 | Givoly | 709/200 |
| 7,143,442 B2 | 11/2006 | Scarfe et al. | |
| 7,171,689 B2 * | 1/2007 | Beavers | 726/22 |
| 7,246,166 B1 | 7/2007 | Watson | |
| 7,299,504 B1 * | 11/2007 | Tiller et al. | 726/30 |
| 7,424,742 B1 * | 9/2008 | Dash et al. | 726/22 |
| 7,478,151 B1 * | 1/2009 | Maiocco et al. | 709/223 |
| 7,627,544 B2 * | 12/2009 | Chkodrov et al. | 706/48 |
| 7,761,918 B2 * | 7/2010 | Gula et al. | 726/23 |
| 2002/0019945 A1 | 2/2002 | Houston et al. | |
| 2002/0053033 A1 * | 5/2002 | Cooper et al. | 713/201 |
| 2002/0152185 A1 | 10/2002 | Jamadagni | |
| 2002/0199024 A1 * | 12/2002 | Givoly et al. | 709/248 |
| 2003/0009547 A1 * | 1/2003 | Benfield et al. | 709/223 |
| 2003/0093514 A1 | 5/2003 | Valdes et al. | |
| 2003/0120935 A1 | 6/2003 | Teal et al. | |
| 2003/0130967 A1 * | 7/2003 | Mannila et al. | 706/1 |
| 2003/0149727 A1 * | 8/2003 | Jaschek et al. | 709/206 |
| 2003/0165121 A1 | 9/2003 | Leung et al. | |
| 2003/0182580 A1 | 9/2003 | Lee | |
| 2003/0200192 A1 * | 10/2003 | Bell et al. | 707/1 |
| 2003/0200318 A1 | 10/2003 | Chen et al. | |
| 2003/0236995 A1 * | 12/2003 | Fretwell, Jr. | 713/200 |
| 2004/0015783 A1 * | 1/2004 | Lennon et al. | 715/523 |
| 2004/0049698 A1 | 3/2004 | Ott et al. | |
| 2004/0073800 A1 | 4/2004 | Shah et al. | |
| 2004/0098623 A1 | 5/2004 | Scheidell | |
| 2004/0103021 A1 | 5/2004 | Scarfe et al. | |
| 2004/0111637 A1 | 6/2004 | Baffes et al. | |
| 2004/0250112 A1 * | 12/2004 | Valente et al. | 713/200 |
| 2005/0005017 A1 | 1/2005 | Ptacek et al. | |
| 2005/0021740 A1 | 1/2005 | Bar et al. | |
| 2005/0037733 A1 | 2/2005 | Coleman et al. | |
| 2005/0044406 A1 | 2/2005 | Stute | |
| 2006/0020582 A1 * | 1/2006 | Dettinger et al. | 707/3 |
| 2006/0089985 A1 * | 4/2006 | Poletto | 709/224 |
| 2006/0218640 A1 | 9/2006 | Lotem et al. | |
| 2006/0242694 A1 * | 10/2006 | Gold et al. | 726/13 |
| 2007/0086480 A1 | 4/2007 | Elzur | |
| 2007/0156656 A1 * | 7/2007 | Pather et al. | 707/3 |
| 2008/0046572 A1 | 2/2008 | Jagels | |
| 2010/0058165 A1 | 3/2010 | Bhattacharya et al. | |

OTHER PUBLICATIONS

U.S. Appl. No. 10/602,846, filed Jun. 23, 2003, Office Action Mailing Date Jul. 14, 2005.

Helmer, Guy G. et al., "Intelligent Agents for Intrusion Detection," Iowa State University, Ames Iowa 50011, 4 pages.

Lam, Kwok-Yan et al., "Multivariate Data Analysis Software for Enhancing System Security," Journal of Systems Software, Dec. 1995, vol. 31, Issue 3, pp. 267-275.

Ning, Peng et al., "Abstraction-Based Intrusion Detection in Distributed Environments," 2001, ACM Transactions on Information and System Security (TISSEC), vol. 4, Issue 4, pp. 407-452.

\* cited by examiner

METHOD AND SYSTEM FOR INLINE TOP N QUERY COMPUTATION

CROSS-REFERENCE TO RELATED APPLICATIONS

Related applications are "Network Security Monitoring System," Ser. No. 10/443,946, filed May 21, 2003; "Method and System for Determining Intra-Session Event Correlation Across Network Address Translation Devices," Ser. No. 10/602,846, filed Jun. 23, 2003; and "Method and System for Displaying Network Security Incidents," Ser. No. 10/661,224, filed Sep. 12, 2003. This application hereby incorporates by reference the entire disclosure, drawings and claims of each of the above-referenced applications as though fully set forth herein.

FIELD OF THE INVENTION

The present invention relates generally to the field of computer network security, and in particular to a method and system for inline top N query computation.

BACKGROUND OF THE INVENTION

Figure 1:
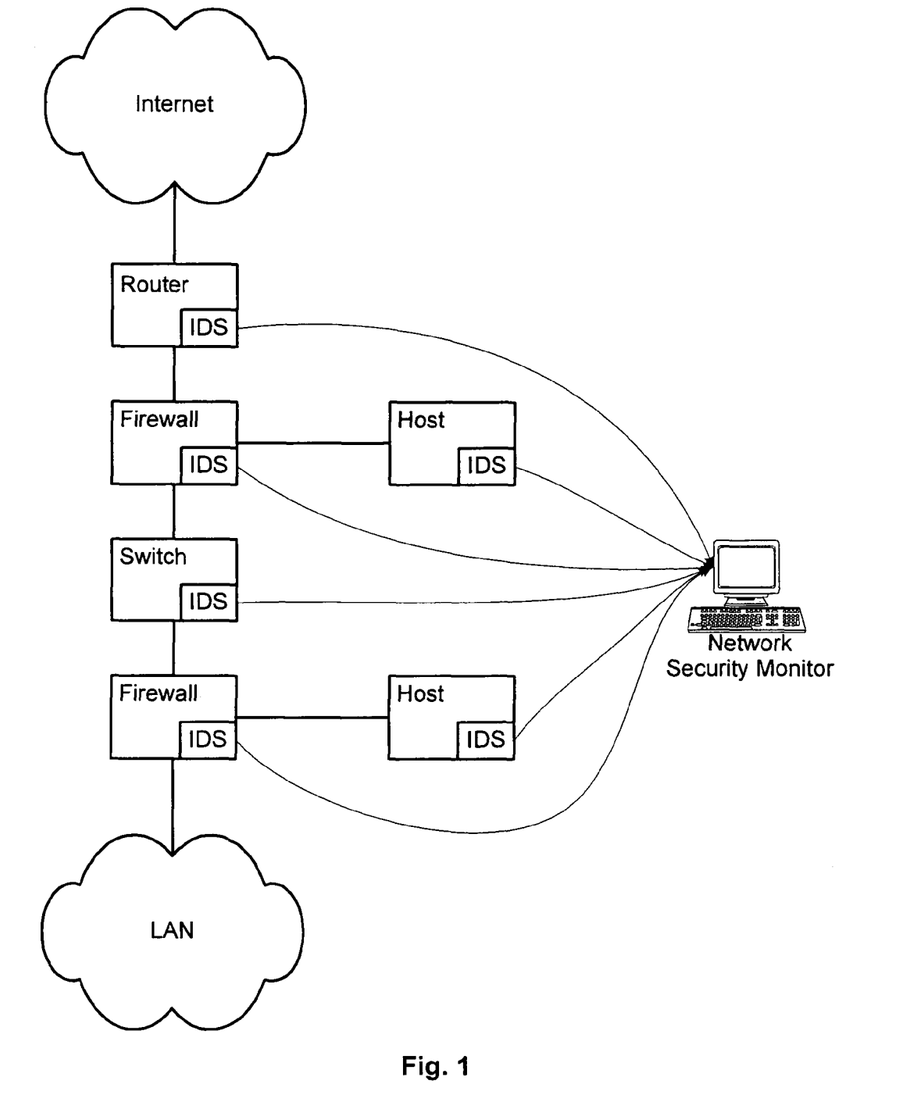
FIG. 1 illustrates a computer network including multiple security devices that report network events to a network security monitor.

Computer network security is becoming an increasingly urgent issue with the wide use of computer networks. To prevent and/or reduce the damage caused by network attacks, various security devices such as intrusion detection sensors (IDS's), as shown in FIG. 1, are deployed over a computer network to detect security-related events. For example, IDS's may be attached to routers, firewalls, switches and hosts. A security device is configured such that whenever it detects a suspicious network activity, e.g., a suspicious IP packet, it will submit a corresponding network event to a network security monitor, which is responsible for analyzing network events originated from different parts of the network and facilitating early detection of any potential network attacks.

Queries run against the information collected by the network security monitor may be used to identify attacks against the computer network and other security issues. Typically, to execute such queries, the information collected by the network security monitor must be stored in a database, and then various queries are run against the database using conventional DBMS mechanisms. While the volume of network events generated by the security devices in an average corporate network during a short period of time, such as an hour, can be stored and analyzed using conventional database systems, analyzing data collected over longer periods of time, such as days, weeks or months, or analyzing data collected from large networks, becomes impractical due to the very large volumes of data and the high rate at which the data is being received.

SUMMARY

A "top N" query is one where execution of a query against a set of information returns results indicating the "top N" results. The top N results may be the N items having the highest number of matching events.

A system for generating an overall top N query result from multiple sets of sessionized network events that correspond to different time periods include identifying a subset within each set of network events whose event attributes satisfy a predefined query, generates an aggregation result table for each identified subset of network events in accordance with an aggregation attribute, identifies matching first and second entries in first and second aggregation result tables that have a same aggregation attribute value, generates a new entry in a query result table by merging the matching first and second entries together, and selects entries in the query result table that have highest session counts as the overall top N query result.

BRIEF DESCRIPTION OF THE DRAWINGS

Like reference numerals refer to corresponding parts throughout the several views of the drawings.

DESCRIPTION OF EMBODIMENTS

In a typical computer network setting as shown in FIG. 1, a stream of network events generated by different IDSs are collected and processed by a software program running within the network security monitor so as to detect any potential network intrusion as early as possible.

According to some embodiments, to reduce the workload of the network security monitor, the network events are first "sessionized" into different network sessions based upon their respective event attributes, e.g., source address, source port, destination address, destination port and protocol, etc. In one embodiment, network events having the same or equivalent source address, source port, destination address, destination port, and network protocol, and which occur within a short time of each other, are assigned the same session identifier. (Equivalent addresses and ports are determined in accordance with network address translations by NAT devices in the network.) After sessionization, multiple network events are associated with a same network session, which are subsequently processed by the network event monitor on a session-by-session basis.

Very often, sessionization itself may not bring the workload of conducting a top N query down to a level that is manageable by a state-of-the-art network security monitor.

As a result, the sessionized network events are further partitioned into different time periods during which they arrive at the network security monitor. For example, time may be divided into ten-minute periods, with the network events received during each ten-minute period being treated as a distinct group for purposes of initial query processing. The network security monitor, in turn, conducts a series of mini top N queries, each mini top N query being executed against a distinct group of network events and producing a respective mini top N query result. Periodically or upon request, the network security monitor merges the mini top N query results to generate an overall top N query result for a relatively long period of time, e.g., an hour or a day.

Figure 2:
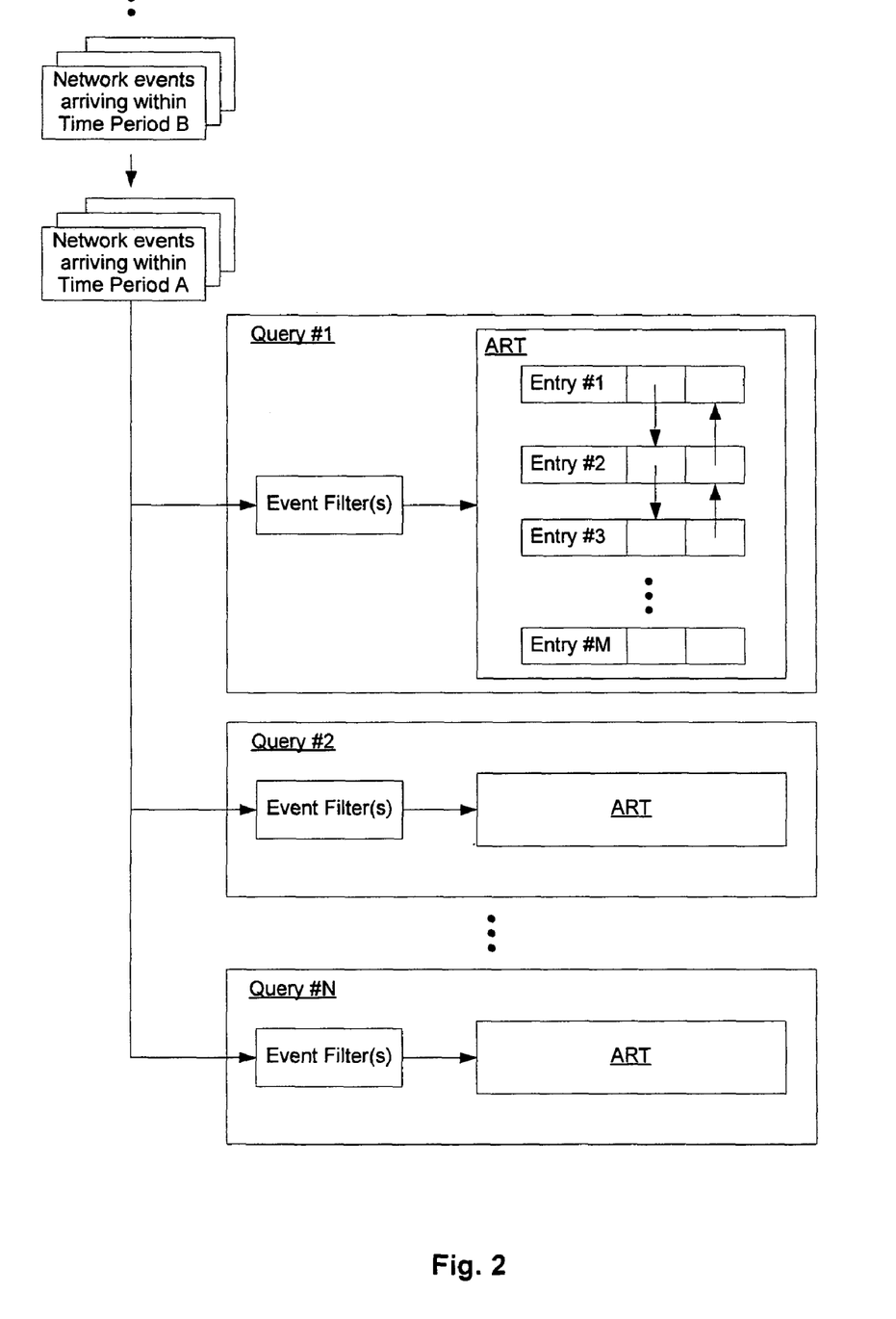
FIG. 2 is a diagram illustrating how mini top N queries are conducted according to one embodiment of the present invention.

FIG. 2 is a diagram illustrating how mini top N queries are conducted according to one embodiment of the present invention. Upon receipt of one or more sessionized network events within a time period, e.g., the time period A, the network security monitor checks the attributes of each network event to determine if they can satisfy a set of event filters associated with a query, e.g., query #1. In some embodiments, the time period is set to be 4, 5, 6, 10, 15 or 20 minutes long, since many top N query results are needed on an hourly or daily basis and the aforementioned time periods occur an integer number of times per hour.

If a network event's attributes satisfy the set of event filters, the network event will be registered at an entry of the aggregation result table (ART) according to a predefined aggregation attribute. In some embodiments, the entries in the aggregation result table are organized in an order defined by their respective aggregation attribute value. For example, the top M entries in the aggregation result table correspond to the top M query results for query #1 during time period A. M is typically much larger than N, where N is the number of top results to be obtained from the main "Top N" query. For example, if N is equal to 10 or 20, M may be equal to a value between 100 and 1000. More details about the process for updating the aggregation result table are provided below in conjunction with FIGS. 7 and 8. If the network event's attributes fail satisfying any (i.e., at least one) of the event filters associated with query #1, the network event will not be registered at the aggregation result table associated with query #1.

Figure 3:
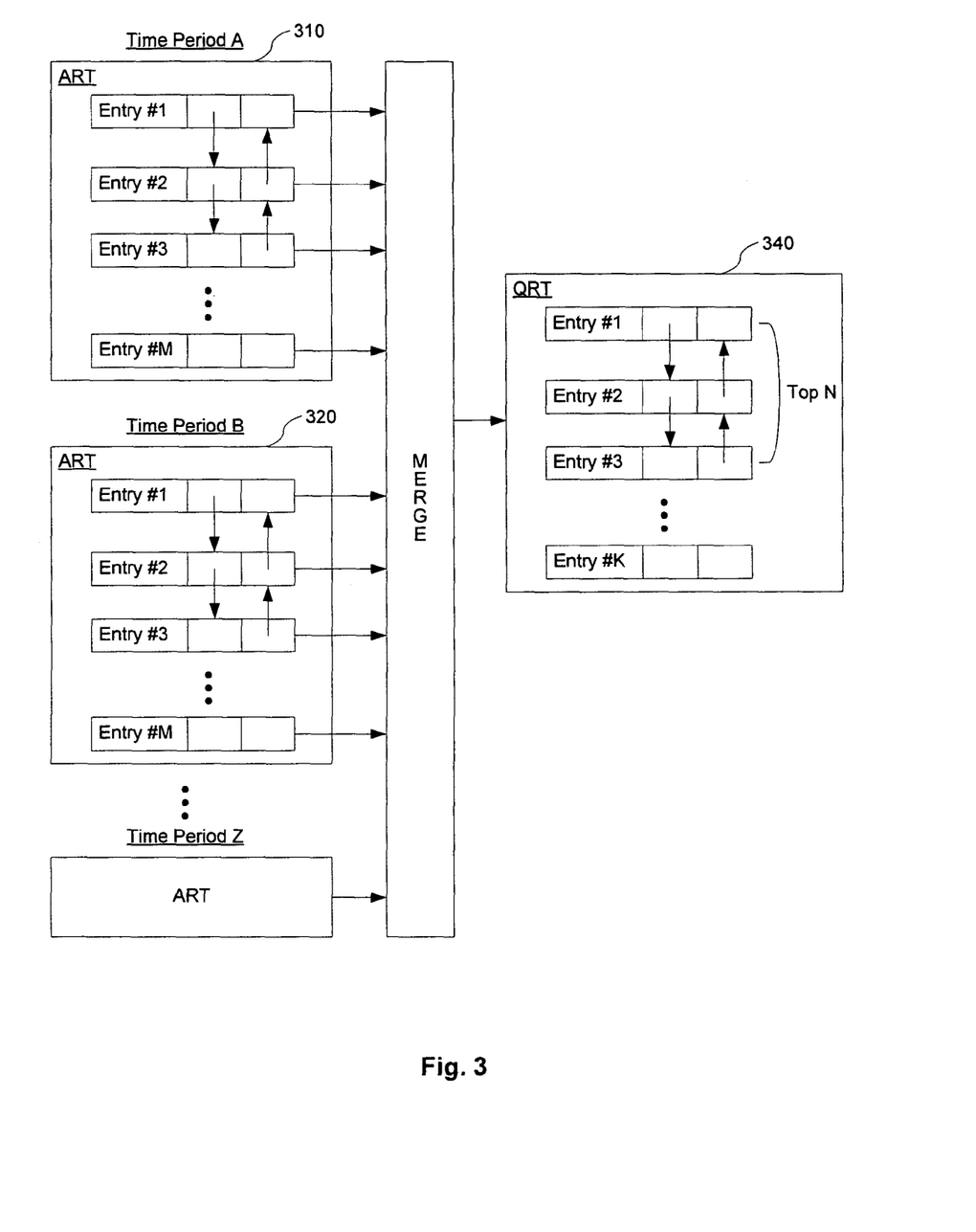
FIG. 3 is a diagram illustrating the process of generating an overall top N query result out of multiple mini top N query results.

Note that it is possible that a network event may satisfy event filters associated with multiple queries and therefore be registered at multiple aggregation result tables. Therefore, whether or not the network event is registered at query #1, the network security monitor may continue to check the network event against the event filters associated with subsequent queries, e.g., query #2, query #3, . . . , query #Q, respectively. In addition to processing each received network event against all the queries, the network event is saved in an event log file accessible by the network security monitor. The network security monitor repeats the above-mentioned process for every network event arriving within the time period A until the time period A is over. At the end of the time period A, the mini top N query results as represented by the aggregation result tables associated with the queries are stored in a file, e.g., a database management system. The stored mini top N query results are available for generating the overall top N query result, for any user specified or system specified time period. In addition, the aggregation result tables are cleared for generating a new mini top N query result for the next time period, e.g., the time period B as shown in FIG. 3.

After a substantial period of time, e.g., 24 hours, a significant number of mini top N query results will have been accumulated and the network security monitor may merge the data in the corresponding aggregation result tables into a query result table (QRT) 340. FIG. 3 is a diagram illustrating the process of generating a query result table, and identifying the overall top N query results, from the merged aggregation result tables. For purposes of this example, the mini top N query results all correspond to a same query and each aggregation result table includes up to M entries, entry #1, entry #2, . . . , entry #M. (In some embodiments, all the aggregation result tables have M entries, but some of those entries may be empty.)

Any of a number of different data merging techniques can be used to merge the data from all the aggregation result tables (also herein called mini top N query results) corresponding to a specified time period. Different embodiments may use different data merging methods. In some embodiments, the query result table may be configured to have an unlimited number of entries, thereby allowing all entries in the aggregation result tables for a specified period of time to be represented by a corresponding entry in the query result table. In other embodiments, the size of the query result table may be limited to K entries, where K is a sufficiently large number that the merging process is either certain or very highly likely to produce a query result table that accurately identifies the top N query results.

After the merging of the data from the aggregation result tables into the query result table is completed, the top N (e.g., 10, 20 or 100) entries in the query result table comprise the top N query result to be transmitted to a requester and/or displayed on a medium, e.g., a computer monitor, in a graphic mode.

Figure 4:
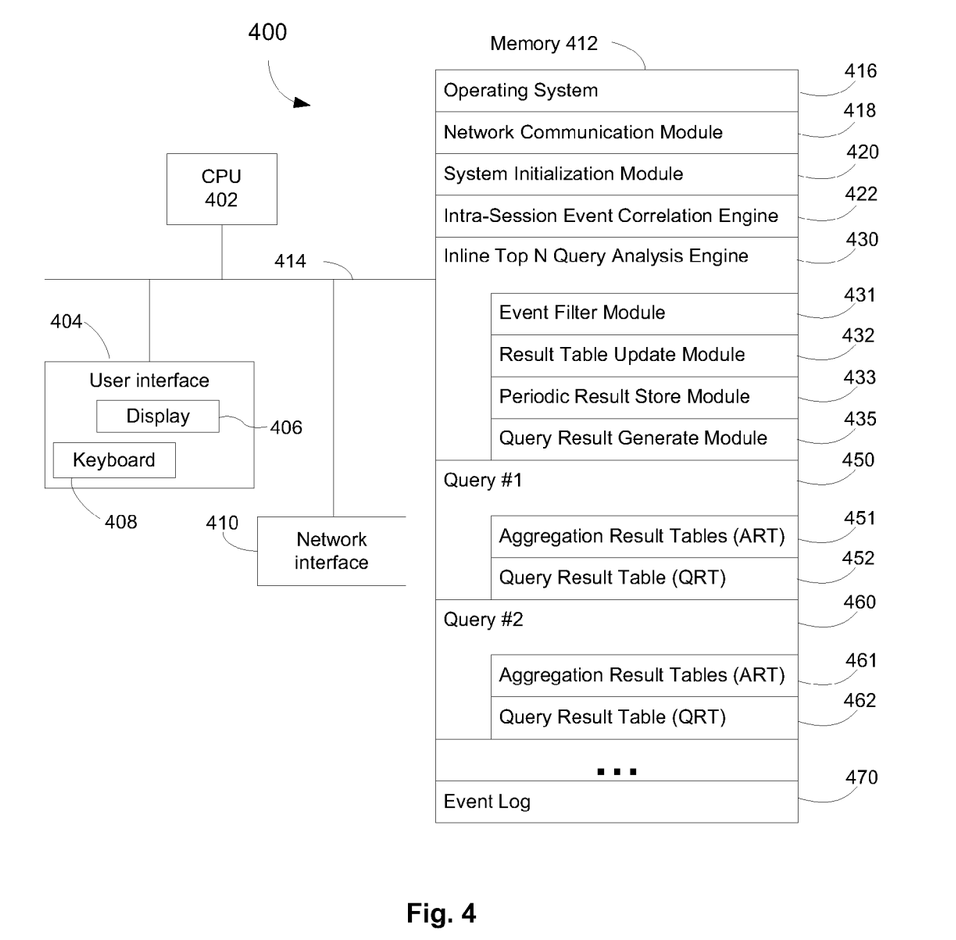
FIG. 4 is a block diagram illustrating a network security monitor in accordance with one embodiment of the present invention.

FIG. 4 is a block diagram illustrating a network security monitor 400 in accordance with one embodiment of the present invention. The network security monitor 400 typically includes one or more processing units (CPU's) 402, one or more network or other communications interfaces 410, memory 412, and one or more communication buses 414 for interconnecting these components. The network security monitor 400 may also include a user interface 404 comprising a display device 406 and a keyboard 408. Memory 412 may include high speed random access memory and may also include non-volatile memory, such as one or more magnetic disk storage devices. In some embodiments, the memory 412 stores the following programs, modules and data structures, or a subset thereof:

- an operating system 416 that includes procedures for handling various basic system services and for performing hardware dependent tasks;
- a network communication module 418 for connecting the network security monitor 400 to other computers via the one or more communication network interfaces 410 (wired or wireless), such as the Internet, other wide area networks, local area networks, metropolitan area networks, and so on;
- a system initialization module 420 that initializes other modules and data structures stored in memory 414 required for the appropriate operation of the network security monitor 400;
- an intra-session event correlation engine module 422 that groups various network events into different network sessions based upon their event attributes;
- a query analysis engine 430 that is used for generating multiple aggregation result tables, each representing the results of a "top N query" over a short period of time, and for merging the aggregation result tables for each "top N query" into a respective query result table that represents "top N query" result, in accordance with predefined event filters and aggregation rules;
- a plurality of predefined queries (450, 460) and associated top N query results including multiple mini top N query results in the form of aggregation result tables (451, 461) and query result tables (452, 462); and an event log 470 that stores network events processed by the network security monitor 400.

The inline top N query analysis engine 430 includes executable procedures, modules, and other data structures supporting the analysis process. In one embodiment, inline top N query analysis engine 430 includes:

an event filter module 431 that identifies a subset within a set of network events whose event attributes satisfy a predefined query;

a result table update module 432 that aggregates information concerning the identified subset of network events in accordance with at least one of the event attributes;

a periodic result store module 433 that transfers or stores and aggregated result table into a file or a database management system at the end of a corresponding time period; and a query result generate module 435 that generates a query result table, representing a "top N query" result, from a set of aggregated result tables containing top N query results for a sequence of shorter periods of time.

Figure 5:
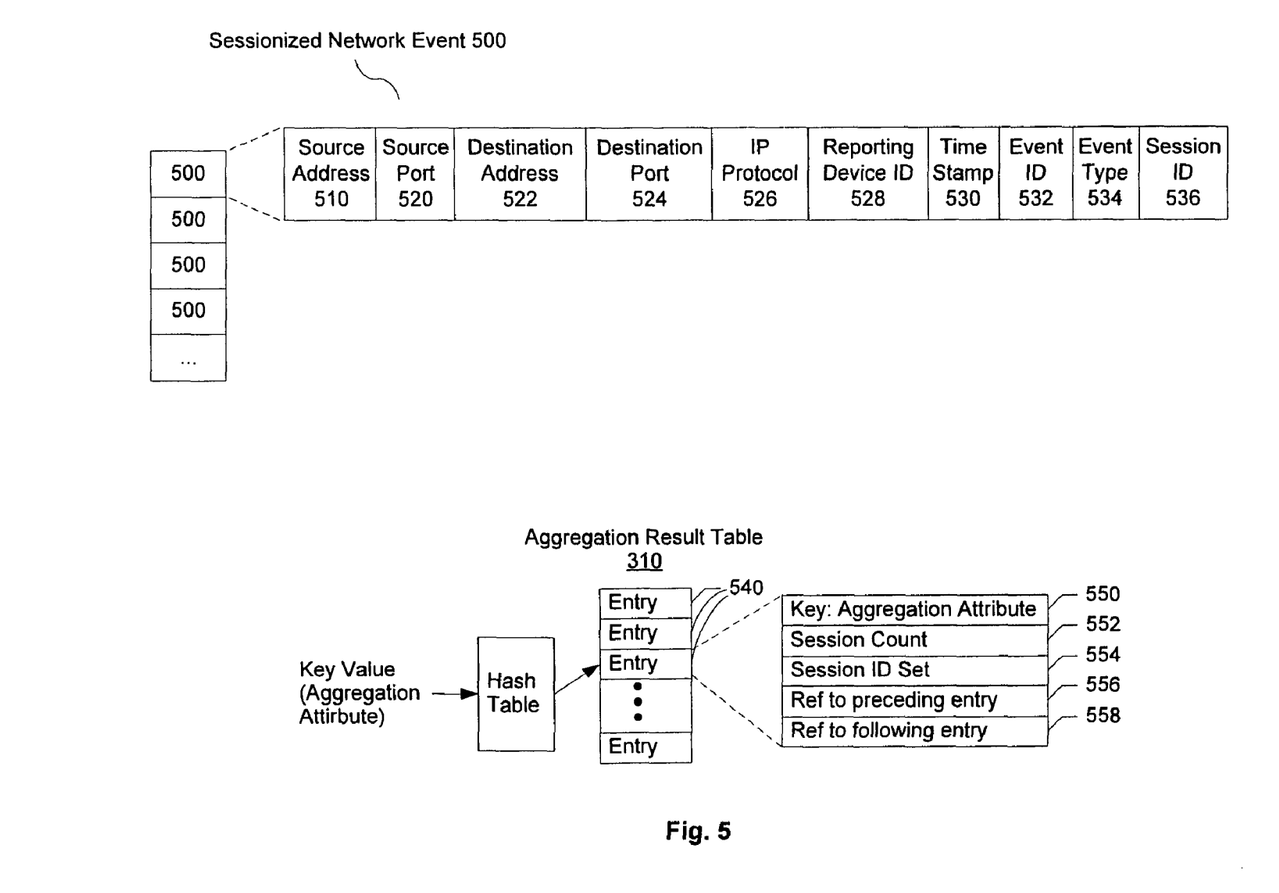
FIG. 5 depicts two data structures that are used for storing sessionized network events and top N query results according to some embodiments of the present invention.

FIG. 5 depicts two data structures that are used for storing sessionized network events and top N query results according to some embodiments of the present invention. An exemplary "sessionized" network event 500 is characterized by the following set of event attributes:

source address 510—the source network address of a packet involved in a potential or real network intrusion, i.e., the address of the attacker;

source port 520—the port on the machine from which the network intrusion was launched;

destination address 522—the destination network address of the packet involved in the intrusion, i.e., the address of a machine under attack;

destination port 524—the destination port that represents a service on the destination host;

IP protocol 526—the IP protocol that was used by the package; the protocol and the destination port may represent the service is being attacked;

reporting device ID 528—the identifier of the intrusion detection device reporting the network event;

timestamp 530—the time at which the network event occurs;

event ID 532—a sequence identifier of this network event; this identifier may be generated by the network security monitor (or alternately by the device reporting the network event), and must uniquely identify the network event to the network security monitor;

event type 534—the type of the packet or the type of security intrusion detected by the reporting device; and session ID 536—a unique session identifier of a network session that the network event is associated with.

In some embodiments, a network event may be represented by a subset of the above identified fields, and/or may include additional fields.

Upon receipt of a sessionized network event 500, the inline top N query analysis engine 430 examines its associated event attributes to determine if this event satisfies a set of event filters associated with a query. If so, this event will be stored in a corresponding aggregation result table 310. In one embodiment, the aggregation result table 310 is implemented as a hash map to facilitate fast mapping of a key value to the corresponding entry in the table. The aggregation result table 310, whether implemented as hash map or otherwise, typically contains multiple entries 540, each entry 540 having a unique key 550 and a set of values 552-558. In one embodiment, the unique key 550 is the aggregation attribute of a query and the set of values includes a session count 552 indicative of the number of unique sessions that are associated with the aggregation attribute, a set 554 of unique session IDs (i.e., the unique session IDs of the sessions associated with the aggregation attribute), a reference 556 to a preceding entry (if any) in the aggregation result table and a reference 558 to a following entry (if any) in the aggregation result table. The references 556, 558 (sometimes called pointers) to the preceding and following entries form a doubly linked list of the entries in the aggregation result table (as shown pictorially in FIG. 2). In some embodiments, the entries 540 in the aggregation result table 310 are kept in sorted order, with the entries having the highest session counts located at the top of the hash map and the entries having the lowest session counts located at the end of the hash map. As a result, for each entry 540 in the aggregation result table 310, the preceding entry has a session count no less than the current entry's count and the following entry (if any) have a session count no more than the current entry's session count. Stated in another way, the entries of the aggregation result table 310 are monotonically ordered, from top to bottom, in accordance with their session counts.

Figure 6:
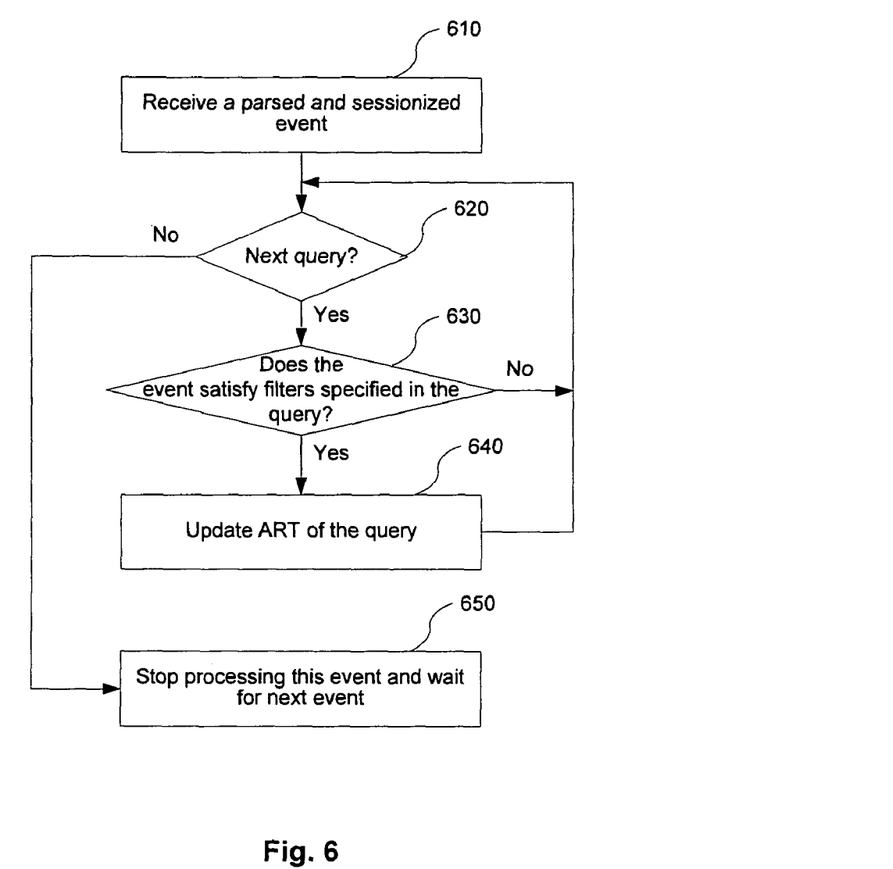
FIG. 6 is an overview flowchart illustrating how a network security monitor processes a newly arriving network event in accordance with one or more predefined top N queries.

FIG. 6 is an overview flowchart illustrating how the network security monitor processes a newly arriving network event in accordance with one or more predefined top N queries. After receiving a parsed and sessionized network event at step 610, the network security monitor checks if there is any query that has not been examined at step 620. The following are a few exemplary top N queries:

top N network event types—listing event types corresponding to a large number of network sessions;

top N attack network event destination ports—listing destination ports whose associated applications are under attack; and top N denied network event destination ports—listing destination ports whose associated applications are being scanned for vulnerabilities.

If there is no unexamined query, the network security monitor will stop processing the network event and wait for next event to arrive at step 650. If there is a query that has not been examined, the network security monitor will check the event's attributes against the query's event filters at step 630. If the event's attributes fail to satisfy at least one event filter, this event will not be a member of the query's result and the network security monitor then returns to step 620 to examine next query. Otherwise, the network security monitor moves to step 640 to update the aggregation result table (ART) associated with the query.

Figure 7:
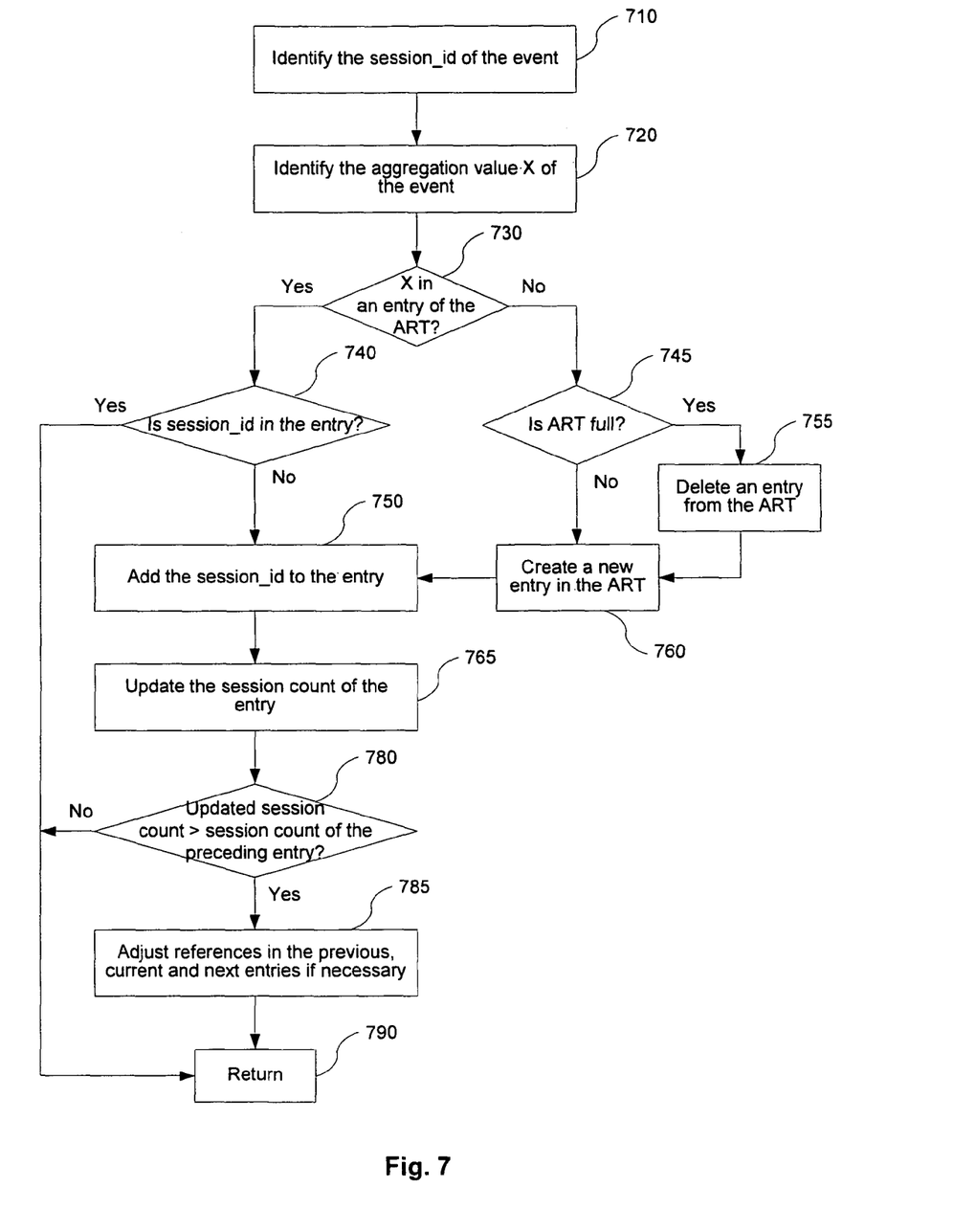
FIG. 7 is a flowchart that provides more details on how to update an aggregation result table if a network event satisfies a query's event filters according to one embodiment of the present invention.

FIG. 7 is a flowchart of the process for updating an aggregation result table when a network event satisfies a query's event filters, according to one embodiment of the present invention. In some embodiments, this process is performed by execution of the result table update module 432 (FIG. 4) of the query analysis module 430. More generally, this process is performed by the network security monitor.

The network security monitor identifies the session ID of the network event (710) being processed, and also identifies the aggregation value X of the network event (720). For example, if the query is "top N network event types", the event's aggregation value X will be its event type attribute. Next, the network security monitor checks if the value X is already in the aggregation result table (730). If the aggregation result table is represented by a hash map, the network security monitor will use the aggregation value X as the key to determine if there is an entry in the hash map including its corresponding value.

If an entry is found in the aggregation result table that includes the value X (730—Yes), the network security monitor then checks if the event's session ID is already a member in the session ID set associated with the entry (740). Since one network session may comprise multiple network events, it is possible that the session ID was previously inserted into the set when an earlier network event sharing the same session ID was processed by the network security monitor. In this case, there is no need for further processing this network event and the update procedure, having completed its work, returns control to a calling procedure (790).

If no matching entry is found in the aggregation result table (730—No), the network security monitor creates a new entry in the aggregation result table for hosting the network event (760). In some embodiments, there is a predefined upper limit (e.g., 5000) on the number of entries in the aggregation result table. If the aggregation result table is full (745), meaning that number of entries in the table has reached the predefined upper limit, the network security monitor deletes an entry in the table at 755 to make the room for a new entry associated with the network event. The entry deleted is selected in accordance with a predefined eviction policy. After deletion of the identified entry, a new entry is created in the aggregation result table (760), the session ID of the network event being processes is added to the session ID set of the entry (750), and the session count of the entry is updated (i.e., set to 1, when the entry is a new entry) (765).

In some embodiments, the eviction policy used at 755 is to select the least recently updated entry in the table having the lowest session count in the table. In other words, first the entries having the lowest session count in the table are identified, and then if there are a plurality of such entries, the entry least recently updated is selected as the entry to be deleted. In one such embodiment, when a new entry is added to an aggregation result table, the new entry is inserted in the table in such a way that all the entries having the lowest session count (i.e., a session count of 1) are located at the end of the table, and the least recently updated entry having a session count of 1 is the topmost of the entries having that session count. Similarly, in the aggregation result table is full, and none of the entries in the table have a session count of 1, the table updating procedure will identify the entry having the lowest session count and that was the least recently updated of the entries having that count. In some embodiments, each entry in the table includes a timestamp equal to the timestamp of the last network event to match that entry. In these embodiments the entry timestamps are used in conjunction with the entry session counts to identify which entry to delete at 755.

In other embodiments, other eviction policies may be used to determine the entry in the aggregation table to be deleted at 755. For example, the eviction policy may be to randomly or pseudo-randomly select one the last L entries in the table.

In yet other embodiment, the aggregation result table does not have a fixed maximum size, in which case the update procedure proceeds directly to creating a new entry (760) when a matching entry is not found in the table (730—No). In this embodiment, tasks 745 and 755 are not implemented.

After a new entry in inserted into the aggregation result table (760), or after a network event is found to match an exiting entry in the table (730—Yes) and the event's session ID is not already included in the entry's session ID set (740— No), the session ID of the network event being processed is added to the entry's session ID set (750) and the entry's session count is increase by one (765). As a result, this entry may need to be moved upward in the list of entries in order to keep the list of entries in sorted order in accordance with the session counts. Therefore, the network security monitor checks if the newly updated session count of the entry is higher than the session count of its preceding entry (780). If so, the entry is moved ahead of its preceding entry by adjusting the references in the preceding, current and following entries at step 785. In some embodiments, the entry is moved ahead of its preceding entry if its session count is greater than or equal to the session count of the preceding entry. In one embodiment, the entry is moved ahead of the topmost entry in the table having the same count, by adjusting the references in the all the entries affected by that movement of the entry. In this embodiment, with each set of entries having equal session counts, the least recently updated entry is located lowest in the table.

Figure 8:
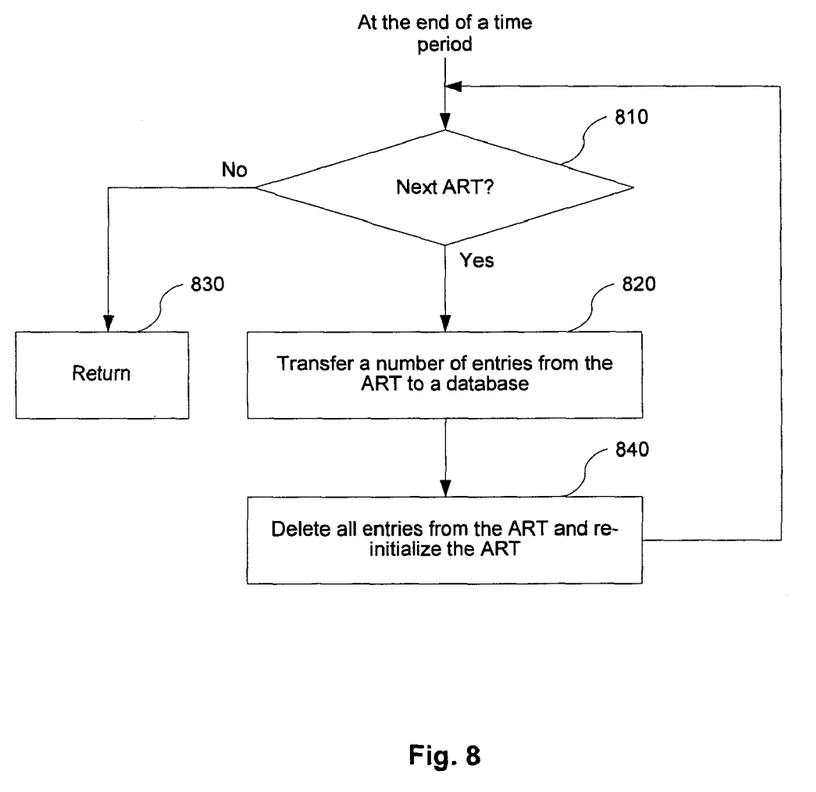
FIG. 8 is a flowchart depicting the operation of the network security monitor at the end of a small time period according to one embodiment of the present invention.

FIG. 8 is a flowchart depicting the operation of the network security monitor at the end of a short time period, according to one embodiment of the present invention. At the end of the time period, the network security monitor identifies an aggregation result table associated with a query (810) and then transfers a number of top entries from the aggregation result table to a database (820). For example, if the aggregation result table has 5000 entries in the memory, the top 1000 entries in the table may be transferred to the database. The number of entries from the aggregation result table that are transferred or copied at 820 may be based on the observation that network events generated by the intrusion detection devices of a network are not randomly distributed, and on the observation that truncating the aggregation result table to a particular number of entries at the end of the time period never or almost never affects the final "top N query result". In some embodiments, the number of entries retained from the top of each aggregation result table is at least ten times the number (N) of results to be generated when the aggregation result tables are merged to form a query result table. More generally, the number of top entries in an aggregation result table that are retained at 820 is selected such that retaining any additional entries in the aggregation result table would have no or little impact on the final result of the corresponding top N query. In some embodiments, when the number of results produced varies significantly from one top N query to another, the truncation size of the corresponding aggregation result tables is different for different ones of the top N queries.

After transferring entries of the aggregation result table into the database, the network security monitor clears the aggregation result table, re-initialize it for a subsequent time period (840). This process is repeated (810) for all the aggregation result tables being maintained by the network security monitor.

Figure 9:
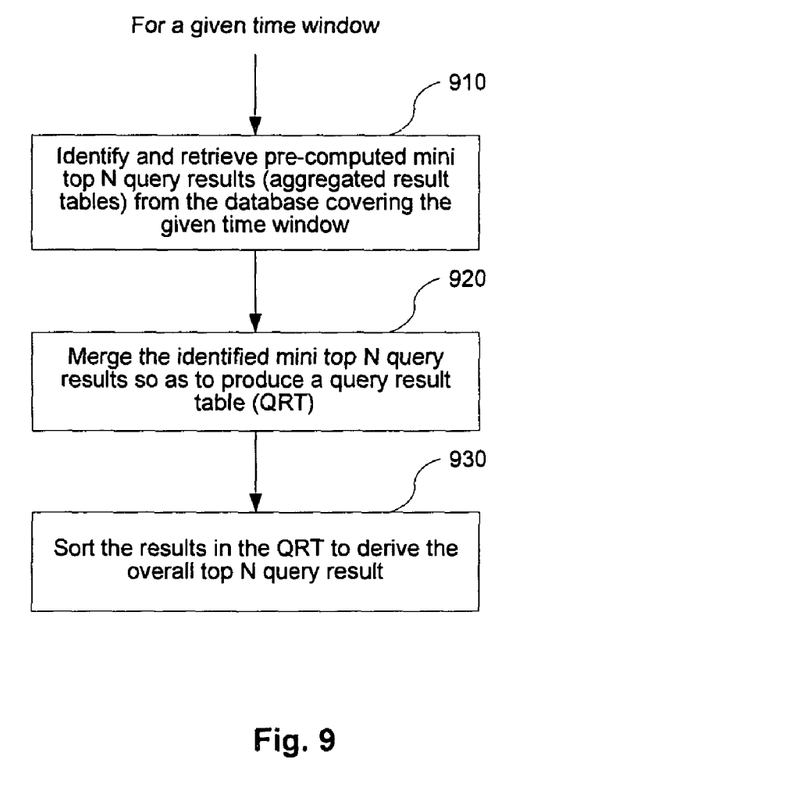
FIG. 9 is a flowchart illustrating how to generate an overall top N query result from a series of pre-computed mini top N query results covering a given time window.

FIG. 9 is a flowchart illustrating how to generate an overall top N query result from a series of aggregation result tables, each containing query results covering a given time window. Given a particular time window (e.g., a 24 hour period), the network security monitor identifies the corresponding aggregation result tables (or the portion thereof retained in a file or database), sometimes herein called the "mini top N query results" (910). Next, the network security monitor merges the identified aggregation result tables into a query result table (920). Finally, the network security monitor sorts the entries in the query result table by their respective session counts and derives the top N entries having highest counts as the overall query result. In some embodiments, the process of merging the identified aggregation result tables automatically produces a sorted query result table, sorted by session number counts. In another embodiment, when it is time to generate an overall top N query, the network security monitor may submit a SQL query to the database hosting the mini top N query results and let the database merge and sort the overall query result in a predefined manner.

Figure 10:
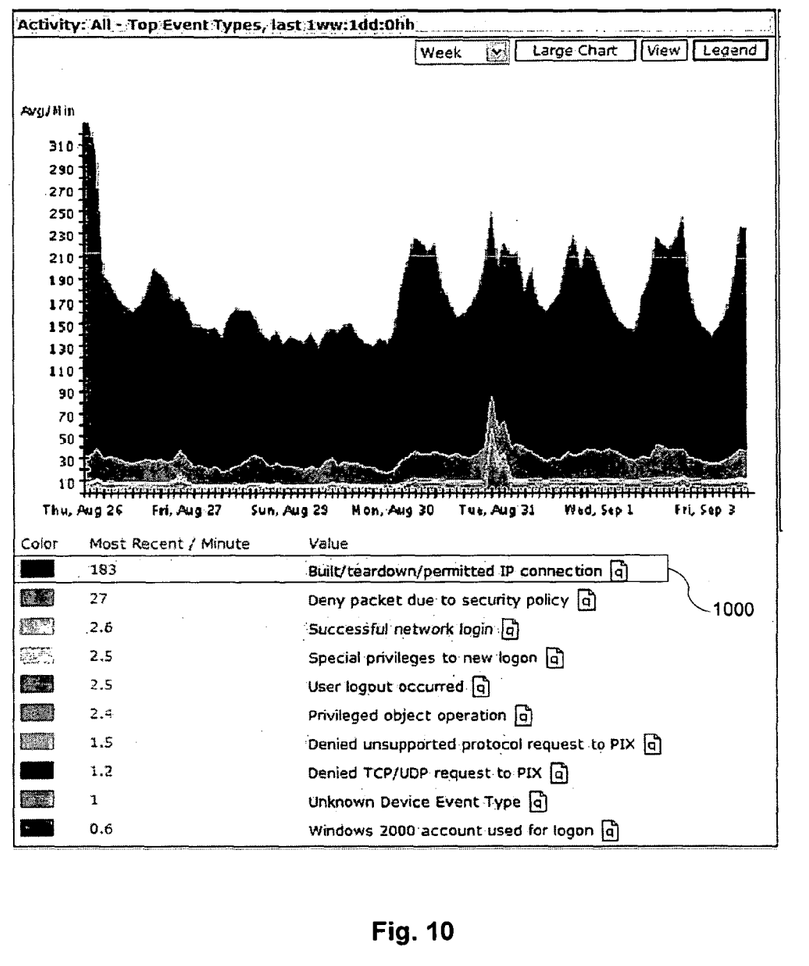
FIG. 10 is a diagram showing the top 10 event types occurring during an 8-day time window.

Producing and storing the mini top N query results for sequences of relatively short time periods substantially reduces the workload associated with the computation of the overall top N query, and also provides the network security monitor with more options on how to display the top N query result. For example, as shown in FIG. 10, different mini top 10 event types corresponding to eight consecutive days are displayed side by side along the time axis to demonstrate one aspect of the ongoing trend of the security-related activity occurring at a computer network. Box 1000 shows that the event type "Built/teardown/permitted IP connection" that normally occurs at the setup or teardown stage of every session is the most dominant event type during these eight days, suggesting that very few or no attacks occurred during this time period.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. A method of processing network events, comprising:
   receiving multiple sets of network events, each set corresponding to a different respective predefined time period and each network event having an associated group of event attributes;
   identifying a subset, within each set of network events, whose event attributes satisfy a predefined query;
   generating a distinct aggregation result table for each identified subset of network events;
   aggregating, in a first aggregation result table, information concerning a first identified subset of network events in accordance with at least one of the event attributes;
   aggregating, in a second aggregation result table, information concerning a second identified subset of network events in accordance with the at least one of the event attributes; and
   merging the first and second aggregation result tables so as to produce a merged set of results for the predefined query;
   wherein the merging further comprises:
      identifying a first entry in the first aggregation result table and a second entry in the second aggregation result table, wherein the first entry and the second entry have the same value for the at least one of the event attributes;
      generating a new entry in a query result table by combining the first and second entries together;
   wherein the method is performed by one or more computing devices.

2. The method of claim 1, wherein the aggregating further includes:
   assigning a session identifier to a network event in a particular identified subset;
   identifying an aggregation entry in a particular aggregation result table, associated with the particular identified subset, in accordance with the network event's value for the at least one of the event attributes, the aggregation entry including a set of session identifiers;
   inserting the network event's session identifier into the set of session identifiers if the network event's session identifier is not included in the set of session identifiers; and
   changing a position of the aggregation entry in the particular aggregation result table if a predefined condition is met.

3. The method of claim 2, wherein the aggregation entry includes a session count and the predefined condition is met if the aggregation entry's session count is higher than the session count of a preceding entry in the particular aggregation result table.

4. The method of claim 2, wherein the aggregation entry includes a session count and the predefined condition is met if the aggregation entry's session count is higher than or equal to the session count of a preceding entry in the particular aggregation result table.

5. The method of claim 1,
   wherein each entry in each aggregation result table includes a respective session count, and the merging includes combining session counts associated with the first entry and the second entry.

6. The method of claim 1, wherein the merging further includes selecting entries in the query result table that satisfy a predefined criterion.

7. The method of claim 6, wherein the predefined criterion is satisfied if a selected entry in the query result table is among a group of entries having highest numbers of session identifiers in the query result table.

8. The method of claim 6, including associating a count with each entry in the query result table, wherein selecting comprises selecting a predefined number of entries in the query result table having highest counts.

9. The method of claim 1, wherein the merging includes associating a session count with each entry in the query result table, and sorting the entries in the query result table in accordance with their respective session counts.

10. The method of claim 1, wherein each of the different respective predefined time periods is less than an hour.

11. The method of claim 1, wherein the merged set of results for the predefined query comprise comprises query results for an aggregate time period of more than 10 hours.

12. The method of claim 1, wherein the aggregating further includes:
   assigning a session identifier to a network event in a particular identified subset;
   identifying an aggregation entry in a particular aggregation result table, associated with the particular identified subset, in accordance with the network event's value for the at least one of the event attributes, the aggregation entry including a set of session identifiers, a link to a preceding entry and a link to a following entry in the particular aggregation result table;
   inserting the network event's session identifier into the set of session identifiers if the network event's session identifier is not included in the set of session identifiers; and
   updating the links to the preceding and following entries if a predefined condition is met.

13. A system for processing network events, comprising:
   one or more central processing units for executing programs; and
   an interface for receiving network events; and
   a query analysis engine executable by the one or more central processing units, the query analysis engine further comprising:
      receiving instructions for receiving multiple sets of the network events via the interface, each set corresponding to a different respective predefined time period and each network event having an associated group of event attributes;

an event filter for identifying a subset, within each set of network events, whose event attributes satisfy a predefined query;
generation instructions for generating a distinct aggregation result table for each identified subset of network events;
aggregation instructions for:
   aggregating, in a first aggregation result table, information concerning a first identified subset of network events in accordance with at least one of the event attributes; and
   aggregating, in a second aggregation result table, information concerning a second identified subset of network events in accordance with the at least one of the event attributes; and
query result instructions for merging the first and second aggregation result tables so as to produce a merged set of results for the predefined query;
wherein the query result instructions further comprise instructions for:
   identifying a first entry in the first aggregation result table and a second entry in the second aggregation result table, wherein the first entry and the second entry have the same value for the at least one of the event attributes; and
   generating a new entry in a query result table by combining the first and second entries together.

14. The system of claim 13, wherein the query analysis engine includes storing instructions for storing at least a portion of aggregated information concerning each identified subset of the network events, and the query result instructions include instructions for merging at least a subset of the stored aggregated information.

15. The system of claim 13, wherein the aggregation instructions include:
   instructions for assigning a session identifier to a network event in a particular identified subset;
   instructions for identifying an aggregation entry in a particular aggregation result table, associated with the particular identified subset, in accordance with the network event's value for the at least one of the event attributes, the aggregation entry including a set of session identifiers;
   instructions for inserting the network event's session identifier into the set of session identifiers if the network event's session identifier is not included in the set of session identifiers; and
   instructions for changing a position of the aggregation entry in the particular aggregation result table if a predefined condition is met.

16. The system of claim 15, wherein the aggregation entry includes a session count and the predefined condition is met if the aggregation entry's session count is higher than the session count of a preceding entry in the particular aggregation result table.

17. The system of claim 15, wherein the aggregation entry includes a session count and the predefined condition is met if the aggregation entry's session count is higher than or equal to the session count of a preceding entry in the particular aggregation result table.

18. The system of claim 13, wherein the query result instructions include selecting instructions for selecting entries in the query result table that satisfy a predefined criterion.

19. The system of claim 13, wherein each entry in each aggregation result table includes a respective session count, and the query result instructions include instructions for combining session counts associated with the first entry and the second entry.

20. The system of claim 18, wherein the predefined criterion is satisfied if a selected entry in the query result table is among a group of entries having highest numbers of session identifiers in the query result table.

21. The system of claim 13, wherein the query analysis engine includes instructions for associating a session count with each entry in the query result table, and the query result instructions include instructions for combining session counts of matching entries in two or more of the aggregation result tables.

22. The system of claim 13, wherein the query analysis engine includes instructions for associating a session count with each entry in the query result table, and instructions for sorting the entries in the query result table in accordance with their respective session counts.

23. The system of claim 18, wherein the query analysis engine includes instructions for associating a session count with each entry in the query result table, and wherein the selecting instructions comprise instructions for selecting a predefined number of entries in the query result table having highest session counts.

24. The system of claim 13, wherein each of the different respective predefined time periods is less than an hour and the merged set of results for the predefined query comprises query results for an aggregate time period of more than 10 hours.

25. A computer program product stored in a non-transitory computer-readable storage medium, for use in conjunction with a computer system, comprising:
   receiving instructions for receiving multiple sets of network events, each set corresponding to a different respective predefined time period and each network event having an associated group of event attributes;
   an event filter for identifying a subset, within each set of network events, whose event attributes satisfy a predefined query; and
   generation instructions for generating a distinct aggregation result table for each identified subset of network events;
   aggregation instructions for: aggregating, in a first aggregation result table, information concerning a first identified subset of network events in accordance with at least one of the event attributes; and
   aggregating, in a second aggregation result table, information concerning a second identified subset of network events in accordance with the at least one of the event attributes; and
   query result instructions for merging the first and second aggregation result tables aggregated information associated with the multiple sets of network events so as to produce a merged set of results for the predefined query;
   wherein the query result instructions further comprise instructions for:
   identifying a first entry in the first aggregation result table and a second entry in the second aggregation result table, wherein the first entry and the second entry have the same value for the at least one of the event attributes; and
   generating a new entry in a query result table by combining the first and second entries together.

26. The computer program product stored in a non-transitory computer-readable storage medium of claim 25, wherein the aggregation instructions further include:
   instructions for assigning a session identifier to a network event in a particular identified subset;

instructions for identifying an aggregation entry in a particular aggregation result table, associated with the particular identified subset, in accordance with the network event's value for the at least one of the event attributes, the aggregation entry including a set of session identifiers;

instructions for inserting the network event's session identifier into the set of session identifiers if the network event's session identifier is not included in the set of session identifiers; and instructions for changing a position of the aggregation entry in the particular aggregation result table if a predefined condition is met.

27. The computer program product stored in a non-transitory computer-readable storage medium of claim 26, wherein the aggregation entry includes a session count and the predefined condition is met if the aggregation entry's session count is higher than the session count of a preceding entry in the particular aggregation result table.

28. The computer program product stored in a non-transitory computer-readable storage medium of claim 26, wherein the aggregation entry includes a session count and the predefined condition is met if the aggregation entry's session count is higher than or equal to the session count of a preceding entry in the particular aggregation result table.

29. The computer program product stored in a non-transitory computer-readable storage medium of claim 25, wherein the query result instructions include selecting instructions for selecting entries in the query result table that satisfy a predefined criterion.

30. The computer program product stored in a non-transitory computer-readable storage medium of claim 25, wherein each entry in each aggregation result table includes a respective session count, and the query result instructions include instructions for combining session counts associated with the first entry and the second entry matching entries of the aggregation result tables comprise entries having a same value for the at least one of the event attributes.

31. The computer program product stored in a non-transitory computer-readable storage medium of claim 29, wherein the predefined criterion is satisfied if a selected entry in the query result table is among a group of entries having highest numbers of session identifiers in the query result table.

32. The computer program product stored in a non-transitory computer-readable storage medium of claim 25, wherein the query result instructions include analysis engine includes instructions for associating a session count with each entry in the query result table, and the query result instructions includes instructions for combining session counts of matching entries in two or more of the aggregation result tables.

33. The computer program product stored in a non-transitory computer-readable storage medium of claim 25, wherein the query result instructions include analysis engine includes instructions for associating a session count with each entry in the query result table, and instructions for sorting the entries in the query result table in accordance with their respective session counts.

34. The computer program product stored in a non-transitory computer-readable storage medium of claim 29, wherein the query result instructions include analysis engine includes instructions for associating a session count with each entry in the query result table, and wherein the selecting instructions comprise instructions for selecting a predefined number of entries in the query result table having highest session counts.

35. The computer program product stored in a non-transitory computer-readable storage medium of claim 25, wherein each of the different respective predefined time periods is less than an hour and the merged set of results for the predefined query comprises query results for an aggregate time period of more than 10 hours the query result instructions include instructions for producing a query result table having entries produced by merging matching entries of the aggregation result tables, and further includes instructions for selecting entries in the query result table that satisfy a predefined criterion.

* * * * *